US009847990B1

(12) United States Patent
de Boursetty et al.

(10) Patent No.: US 9,847,990 B1
(45) Date of Patent: Dec. 19, 2017

(54) DETERMINING, BY A REMOTE SYSTEM, APPLICATIONS PROVIDED ON A DEVICE BASED ON ASSOCIATION WITH A COMMON IDENTIFIER

(71) Applicant: Google Inc., Mountain View, CA (US)

(72) Inventors: Benoît de Boursetty, Santa Monica, CA (US); Nathan Hunt, Playa Vista, CA (US)

(73) Assignee: GOOGLE INC., Mountain View, CA (US)

(*) Notice: Subject to any disclaimer, the term of this patent is extended or adjusted under 35 U.S.C. 154(b) by 46 days.

(21) Appl. No.: 14/802,558

(22) Filed: Jul. 17, 2015

Related U.S. Application Data

(60) Provisional application No. 62/026,410, filed on Jul. 18, 2014.

(51) Int. Cl.
G06F 7/04 (2006.01)
H04L 29/06 (2006.01)
G06F 21/31 (2013.01)
G06F 21/41 (2013.01)

(52) U.S. Cl.
CPC .......... *H04L 63/0815* (2013.01); *G06F 21/31* (2013.01); *G06F 21/41* (2013.01); *H04L 63/0876* (2013.01)

(58) Field of Classification Search
CPC .................................................. H04L 63/0815
USPC ............................................................ 726/8
See application file for complete search history.

(56) References Cited

U.S. PATENT DOCUMENTS

| 8,959,650 B1* | 2/2015 | Richards | G06F 21/335 709/227 |
| 2011/0289172 A1* | 11/2011 | Marcellino | H04L 51/24 709/206 |
| 2012/0214480 A1* | 8/2012 | Ionescu | H04W 4/001 455/425 |
| 2013/0036456 A1* | 2/2013 | Boysen | G06Q 20/04 726/4 |
| 2013/0066644 A1* | 3/2013 | Dicks | A61B 5/0022 705/2 |

(Continued)

FOREIGN PATENT DOCUMENTS

WO WO 0111452 A2 * 2/2001 ............. G06F 21/41

Primary Examiner — Peter Shaw
(74) Attorney, Agent, or Firm — Lowenstein Sandler LLP

(57) ABSTRACT

Systems and methods are provided for determining applications that are co-installed on a device. In an aspect, a system includes a registration component that receives, from a device, a request to register a first application provided on the device with a notification service, the request comprising an account identifier associated with a user identity, a session token, and an identifier for the first application. The session token is derived from an authentication token that is unique to the user identity and the device. The system further includes an authentication component configured to authenticate the user identity using the session token, and a fingerprint component configured to receive a fingerprint of the authentication token based on authentication of the user identity using the session token, wherein the registration component is configured to associate the account identifier, the identifier for the first application, and the fingerprint with one another in a database.

21 Claims, 15 Drawing Sheets

(56) References Cited

U.S. PATENT DOCUMENTS

2013/0191339 A1* 7/2013 Haden ............... G06F 17/3007
                                                          707/638
2015/0188871 A1   7/2015 Lewis et al.

* cited by examiner

DETERMINING, BY A REMOTE SYSTEM, APPLICATIONS PROVIDED ON A DEVICE BASED ON ASSOCIATION WITH A COMMON IDENTIFIER

PRIORITY CLAIM

This application claims priority to U.S. Provisional Patent Application No. 62/026,410 filed on Jul. 18, 2014, and entitled "DETERMINING, BY A REMOTE SYSTEM, APPLICATIONS PROVIDED ON A DEVICE BASED ON ASSOCIATION WITH A COMMON IDENTIFIER." The entirety of the aforementioned application is incorporated by reference herein.

TECHNICAL FIELD

This application generally relates to systems and methods for determining, by a remote system, applications provided on a device based on association with a common identifier.

BACKGROUND

Notifications are mechanisms employed by applications on a software platform that are meant to draw a user's attention to something noteworthy. In general, it is desirable for notifications to reach the user on every single device where the user may see them. Therefore, notifications are typically fanned out to every application capable of handling them. A problem arises when multiple applications on a single device are configured to process the same notification. For example, sometimes a single platform, such as a video-sharing platform, can employ multiple related applications that are designed to work together as a cohesive set. Such applications are referred to in this description as companion applications. The video-sharing platform may employ a first application that is used primarily for viewing videos and another application that is used primarily for uploading new videos and editing the new videos. According to this example, when a device has both applications installed and both applications are capable of handling the same notification for the video-sharing platform, the device will receive duplicate notifications (e.g., one notification for each application). This scenario can become irritating to a user that receives the same information multiple times from different applications provided on a single device.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
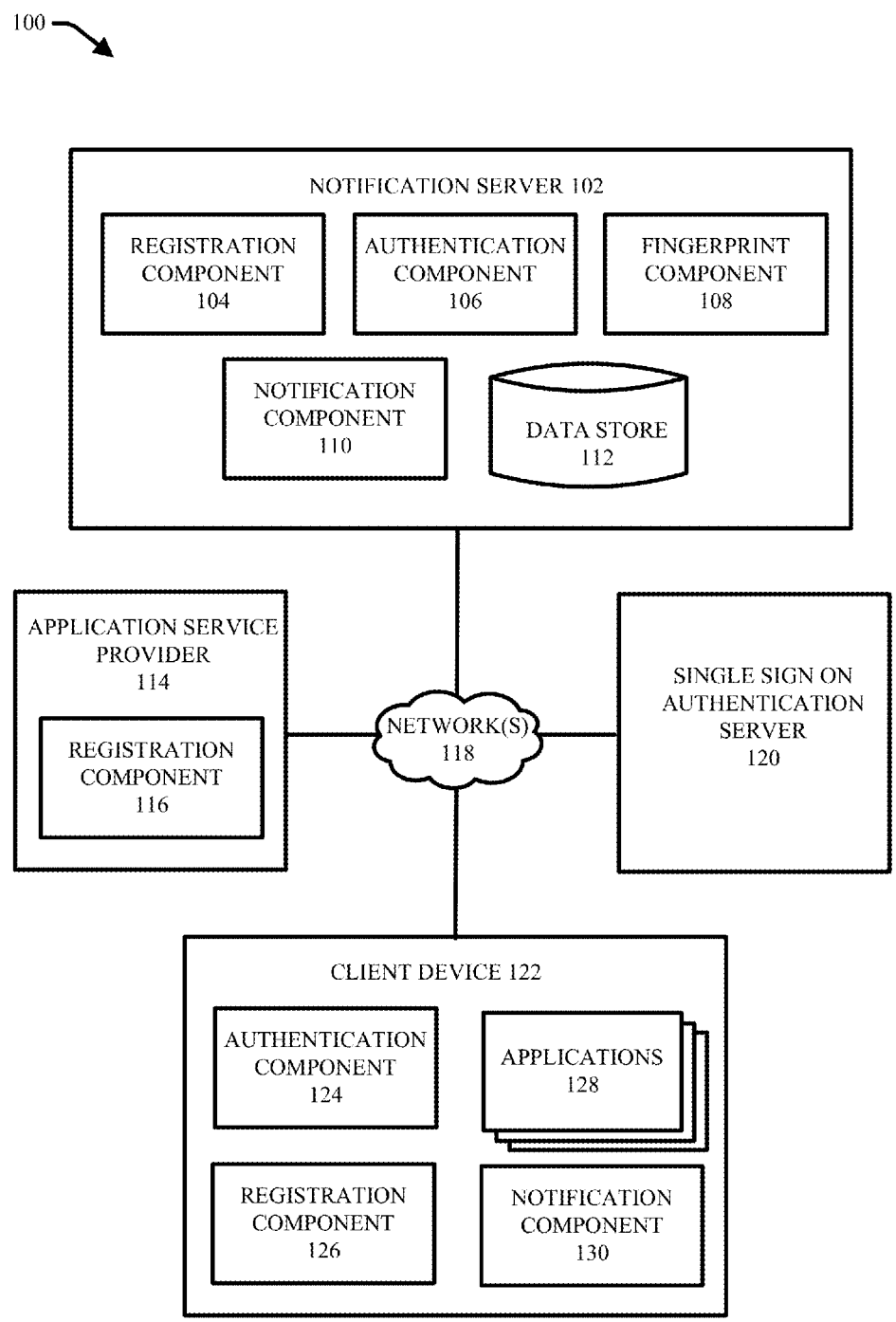
FIG. 1 illustrates an example system for determining, by a remote system, applications provided on a device based on association with a common identifier in accordance with various aspects and embodiments described herein.

The innovation is described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

By way of introduction, the subject matter described in this disclosure relates to determining, by a remote system, companion applications provided on a device based on association with a common identifier. After it is known which companion applications are provided on the device, overlapping or complimentary features of the applications can be optimized to account for the presence of both applications on the same device. In an exemplary embodiment, when two or more applications provided on a device are registered to receive notifications and a single notification is targeted for both applications, rather than sending duplicate notifications to the device for each of the applications, a single one of the applications can be selected to receive the notification.

The subject techniques for determining what applications are provided on a device by a remote system, such as a notification server, capitalizes on a single-sign-on (SSO) user authentication mechanism employed by the applications. SSO is a session/user authentication process that permits a user to enter one name and password in order to access multiple applications. The process authenticates the user for all the applications they have been given rights to and eliminates further prompts when they switch applications during a particular session.

In one or more embodiments, after a user signs into an application on a device, an authentication token is generated that authenticates the user identity with a user account for the application and/or the device. This authentication token is unique to the user identity/account and the device. When an SSO mechanism is employed to sign into the application, this authentication token is shared between a set of applications provided on the device that the user has authorized for SSO authentication. Accordingly, an external system can learn what applications are provided on a particular device and associated with a particular user identity/account based on association with the same authentication token or information representative of the authentication token.

In an aspect, this authentication token is embodied in a session token, derived from the authentication token, each subsequent time the user signs into the respectively joined applications using the SSO mechanism. This session token contains enough information to identify the authentication token that it is derived from. In accordance with an embodiment, when each of these applications register with a notification service to receive notifications, they can respectively provide the notification service with information identifying the user identity/account associated with the registering application, the registering application identity, and the session token (e.g., the session token is shared where the applications register during the same session and thus employ the same session token).

The notification service can employ the session token to obtain a fingerprint (referred herein as a 'token fingerprint') of the authentication token from which the session token was derived by communicating with the SSO server. For example, the token fingerprint can include an identifier such as a string of bytes that uniquely identifies the authentication token among all authentication tokens handled for this user by the SSO server, or even among all authentication tokens handled by the SSO server for all users. In a preferred embodiment, the token fingerprint provides the notification service no information that would be useful for authentication purposes so as not to compromise user security. For example, a token fingerprint that is a salted hash of the authentication token or a uniquely identifying substring of the authentication token (e.g., a prefix of the token) containing no data that would be useful for authentication purposes can ensure user security. Alternatively, the entire authentication token can be used as a "token fingerprint." The notification service can further associate the user identity and the applications with the obtained token fingerprint authentication token in a database. Accordingly, the token fingerprint is used by the notification service to group applications with one another and the user identity/user account as belonging to the same device.

When the notification service receives a request to send a notification to two or more applications for the user identity/account, the notification service can employ the information in the database to identify whether the two or more applications are provided on a single device associated with the user identity/account. For example, the notification service can determine whether the two or more applications are associated with a same authentication token or fingerprint to determine whether they are provided on the same device. In response to a determination that the two or more applications are provided on the same device (e.g., associated with the same session token or fingerprint), the notification service can select only one of the applications to send the notification to.

In an aspect, a system includes a registration component that receives, from a device, a request to register a first application provided on the device with a notification service, the request comprising an account identifier associated with a user identity, a session token, and an identifier for the first application. The session token is derived from an authentication token that is unique to the user identity and the device. The system further includes an authentication component configured to authenticate the user identity using the session token, and a fingerprint component configured to receive a fingerprint of the authentication token based on authentication of the user identity using the session token, wherein the registration component is configured to associate the account identifier, the identifier for the first application, and the fingerprint with one another in a database.

In another aspect, a method is disclosed that includes receiving, from a device, a request to register first and second applications provided on the device with a notification service, the request comprising an account identifier for a user account established with the first and second applications, a session token, and identifiers for the first and second applications, wherein the session token is derived from an authentication token that is unique to the user account and the device. The method further includes authenticating the session token, receiving a fingerprint of the authentication token based on authentication of the session token, and associating the account identifier, the identifiers for the first and second applications, and the fingerprint with one another in a data store.

In yet another aspect, a device is provided that includes an authentication component configured to receive a session authentication token in association with a single-sign-on mechanism employed by two or more applications installed on the device to facilitate signing-in a user identity into a user account established with the two or more applications. The device further includes a registration component configured to send, to a remote notification service, the session token, an account identifier for the user account, and identifiers for the first and second application in association with a request to register the two or more applications for notifications.

Referring now to the drawings, with reference initially to FIG. 1, presented is a diagram of an example system 100 for determining, by a remote system, applications provided on a device based on association with a common identifier in accordance with various aspects and embodiments described herein. Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

System 100 includes notification server 102, application service provider 114, single-sign-on (SSO) authentication server 120 and client device 122. System 100 also includes one or more networks 118 for connecting notification server 102, application service provider 114, SSO authentication server 120 and client device 122. Generally, notification server 102, application service provider 114, single sign-on authentication server 120 and client device 122 can include memory that stores computer executable components and a processor that executes the computer executable components stored in the memory, examples of which can be found with reference to FIG. 15.

Application service provider 114 can include an entity or network source that provides content and/or services, accessible to client device 122 via a network 118, using a network based platform. The network based platform can include a website and/or a client application. Where the network based platform is a website, client device 122 can include and employ a browser to access the network based platform to receive the service and access the content provided by the content/service provider. Where the networked based platform is a client application, client device 122 can include a resident native application for the content/service provider (e.g., stored/provided at client device 122) configured to interact with the content/service provider to receive the service and/or access the content/services provided thereby. For purposes of the subject disclosure, application service provider 114 embodies a ASP that delivers its content and/or services via one or more resident client applications provided at a client device. For example, client device 122 can include a plurality of applications 128 wherein at least one of the applications corresponds to application service provider 114.

For example, ASP 114 can include a video streaming service configured to provide streamed videos to client device 122 via its corresponding video streaming application provided at client device 122. In an aspect, ASP 114 can provide various services and content to a user via multiple related applications. In furtherance to the above example here ASP 114 is a video streaming service, ASP 114 can employ a first application that is intended primarily for viewing videos and another application that is meant primarily for uploading new videos and managing their content. According to this example, applications 128 can include both the first application and the second application, both of which are served by ASP 114.

It should be appreciated that a variety of types of application service providers employing web based platforms, application based platforms, or a combination thereof, are suitable for operation in accordance with aspects of system 100. For instance, in addition to the example above wherein ASP 114 is a video streaming service, ASP 114 can alternatively include an information source that provides encyclopedic information on a variety of subjects. In another example, ASP 114 can include a picture sharing service that also includes messaging functionality and picture editing tools. In another yet example, ASP can include an online shopping service, a navigation application, a social networking system, a music recognition service, a gaming service, etc.

Client device 122 can include any suitable computing device configured to run client applications 128 and interact with ASPs corresponding to those applications 128 (e.g., ASP 114), SSO authentication server 120 and notification server 102 via a network 118. For example, client device 122 can include a mobile phone, a smartphone, a tablet personal computer (PC), a wearable device, or a personal digital assistant (PDA). Client device 122 can also include other computing devices such as a desktop computer, a laptop computer, a television, or an Internet enabled television. As used in this disclosure, the terms "content consumer," "user," or "participant" refers to a person, entity, system, or combination thereof that employs system 100 (or additional systems described in this disclosure) using a client device 122. Networks 118 can include wired and wireless networks, including but not limited to, a cellular network, a wide area network (WAD, e.g., the Internet), a local area network (LAN), or a personal area network (PAN). For example, a client device 122 can communicate with ASP 114, SSO authentication server 120, notification server 102, and/or another client device (and vice versa) using virtually any desired wired or wireless technology, including, for example, cellular, WAN, wireless fidelity (Wi-Fi), Wi-Max, WLAN, and etc. In an aspect, one or more components of system 100 are configured to interact via disparate networks.

Notification server 102 is configured to send push notifications from a third party server to a particular client device in response to receiving a request from the third party server to send the push notifications to a particular instance of an application installed on the client device that is served by the third party server (e.g., a developer or publisher of the application). For example, notification server 102 can send a push notification from ASP 114 to client device 122 in response to receiving a request from the ASP 114 to send push notification to a particular application 128 installed on the client device 122 that is served by ASP 114. The content and purpose of the notification can vary depending on the functions and services provided by the application and its corresponding ASP. For example, where ASP 114 is a media sharing platform and a client application 128 facilities accessing streaming media provide by the streaming media platform, such a push notification can include information related to media content items that a user of client device 122 may be interested in.

In order to receive such push notifications, the client application 128 must first register for push the notifications. Registration for push notification typically involves two steps. First the application registers with a notification server 102 that is specific to an operating platform of the client device 122. Notification server 102 includes registration component 104 to facilitate the first registration between the application 128 and the notification server 102. With the first registration, the application 128 provides the notification server 102 with a messaging address for the client device 122. A second registration occurs with the ASP 114 that corresponds to the application 128. ASP 114 can include registration component 116 to facilitate registration between the application and the ASP 114. With the second registration, the application provides its messaging address to ASP 114 (e.g., either directly or the notification server passes on the messaging address onto the ASP 114). After both registrations steps are complete, when the ASP 114 has a notification to send out to the client application 128, it looks at the messaging address that it obtained from the client application 128 and forwards the notification to the notification server 102 for forwarding to the client device 122.

In general, it is desirable for notifications to reach a user on every single device where the user may see them (e.g., where the user has an application and user account for the application registered to receive notifications). Therefore, notifications provided by an ASP that are directed to a user identity/account for the user are typically fanned out to every instance of a registered application capable of handling them. In some scenarios, if client device 122 has two or more related applications installed that are set to receive push notifications, the ASP of those related applications may request notification server 102 send the same or similar push notification to each of the related applications. As a result, duplicate notifications are provided by the notification server 102 to the user at the client device 122.

For example, where ASP 114 is a video sharing platform, client device 122 can have installed on it a first application meant primarily for viewing videos (e.g., referred to herein as the viewer application), and a second application meant primarily for uploading new videos and managing their content (e.g., referred to herein as the creator application). Both of these applications can further be configured to receive notifications regarding comments on videos affiliated with the user of the application (e.g., videos uploaded by the user, videos liked or watched by the user, etc.). According to this example, when the video sharing platform has a notification regarding a comment on a video affiliated with the user, it will address the notification to each of these applications. Because each of the applications are provided on client device 122, the client device will receive duplicate nonfictions.

One option to circumvent duplicate notifications would be to arbitrarily select only one application to direct the notifications to (e.g., either the viewer application or the creator application). However, a problem arises where the user employs a second device with only one of the two applications and the application provided on the second device is not selected for receiving the notification. For example, system 100 can include a second client device (not shown) employed by the user with only the viewer application installed. In this case, from the notification server's 102 point of view there are three application instances for registered for the user (two viewer applications and one creator application). It is not desirable for all of them to notify the user because that would result in duplicate notifications at the first device. But how can the notification server know which of the two viewer application instances are provided on the same device as the creator application instance?

Previously, this problem has be resolved using some form of device identifier (e.g., phone number, serial number, etc.) which is guaranteed to be identical between multiple applications installed on the device. When registering for notifications, each application reports this device identifier to the notification server 102 so that the notification server knows which applications are installed together on the same device based on association with the same device identifier. However, this solution requires either some platform support for such a stable identifier, or some communication capabilities between applications that are installed on the same device so that they can agree on a single identifier. Another attempted mechanism relies purely on client-side negotiation between the applications to determine which application to notify. For example, an application may, (depending on the capabilities of the device operating platform), detect which other applications are installed on the same device using a variety of mechanisms. Each of the applications can then agree, based on the applications that they respectively knows are co-installed on the device, whether to notify the user or not. This solution is also difficult because it introduces client-side integration issues. In addition, this solution does not solve the case where the companion applications are in fact signed in under different accounts and therefore should not prevent each other from showing notifications.

In light of the deficiencies of the previous solutions noted above, system 100 provides a new mechanism for determining which companion applications provided on client device 122 should receive a notification when both companion applications are capable of handling the notification. In particular, rather than employing a device identifier or client side negotiation between applications 128, the subject system relies on an SSO user authentication mechanism employed by the various applications 128. Generally, an SSO mechanism allows a user to access a group of authorized application services by signing on once to the applications.

In an aspect, client device 122 includes authentication component 124 to provide a SSO mechanism for applications 128. Authentication component 124 is configured interact with SSO authentication server 120 in association with signing a user into one or more applications 128. In an aspect, when a user of client device 122 accesses one of applications 128 for the first time, authentication component 124 can direct the user to SSO authentication server 120 to perform a sign-on operation. For example, the sign-on operation can include provision of username and password the user has established for an account required or associated with access of the services provided by the application. After the SSO authentication server 120 has authenticated the identity of the user, SSO authentication server 120 returns an authorization token or assertion to the authentication component 124, (client device 122 and/or application), as authentication proof that authenticates the user identity with a user account for the application and/or the device 1.

When an SSO authentication mechanism is employed by the application and other applications provided on the device to join authorization and sign in information for the user identity, this authentication token is shared between each of the applications 128 to authenticate the user identity in association with initial signing-on to the respective applications. This authentication token is embodied in a session token each additional time the user signs into the respective application. This session token contains enough information to identify the authentication token that it is derived from. For example, when the user attempts to access another application 128 provided on client device 122, the user can authorize the other application to employ the previously generated session token to perform authentication for access of the other application without signing on again. The authorization token and session token are unique to the user identity/account and the device. A variety of SSO authentication mechanisms are suitable for employment in association with various aspects of the subject disclosure. However a common feature of the respective suitable SSO authentication mechanisms is the generation and sharing of a common authorization token and/or session authorization token between the respective applications that is unique to a user identity/account and client device.

The various aspects of system 100 involve registration of one or more applications provided on client devices for notifications and provisions of notifications by notification server 102 to the client devices following registration. Example client device 122 can include registration component 126 to facilitate registration of the one or more applications 128 for notifications and notification component 130 to facilitate receiving and displaying notifications. Notification server 102 can include registration component 104, authentication component 106, fingerprint component 108, notification component 110, and data store 112 to facilitate registration of one or more applications 128 provided on client device 122 for notifications and provisions of notifications to client device 122 following registration.

Figure 2:
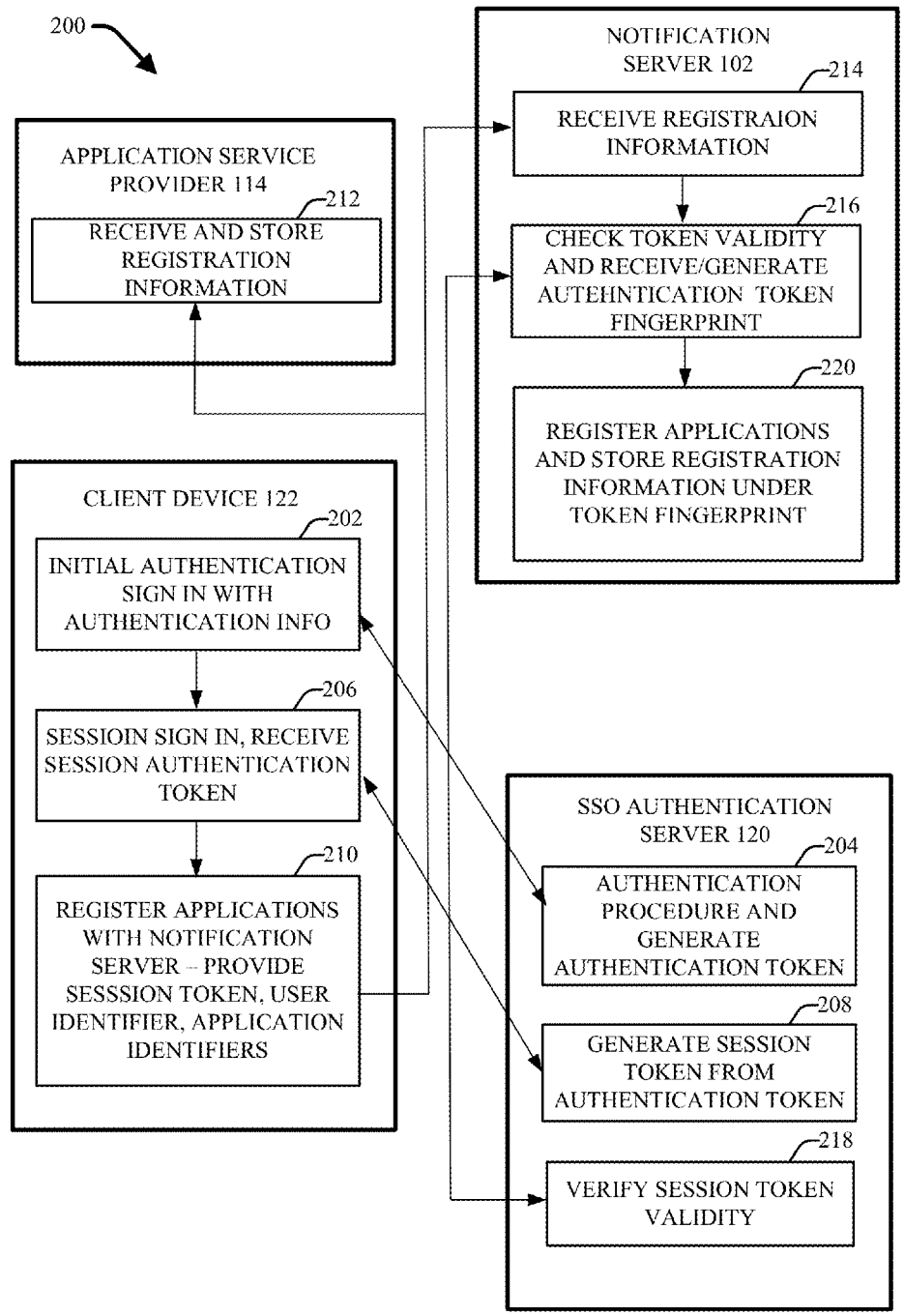
FIG. 2 provides a flow diagram of an example notification registration process in accordance with various aspects and embodiments described herein.
Figure 3:
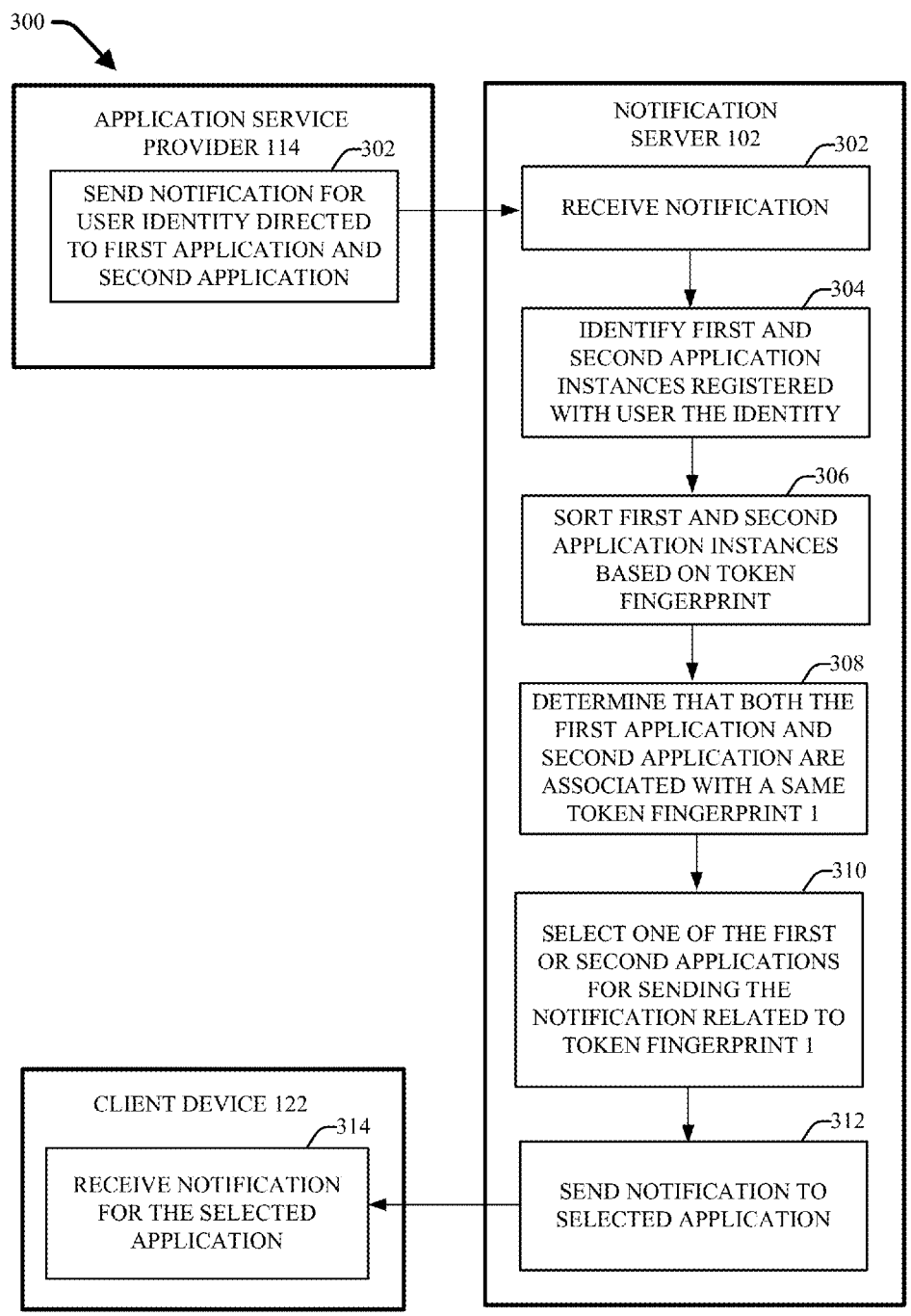
FIG. 3 provides a flow diagram of an example notification process in accordance with various aspects and embodiments described herein.

FIG. 2 provides a flow diagram of an example notification registration process 200 between SSO authentication server 120, client device 122, notification server 102, and ASP 114. FIG. 3 provides a flow diagram of an example notification process 300 between ASP 114, notification server 102 and client device 122 following registration, in accordance with various aspects and embodiments described herein. The various components of system 100 are now described in association with processes 200 and 300.

With reference to FIG. 2, the notification registration process 200 involves provision of registration information by client device 122 to notification server 102 and ASP 114. A key piece of this registration information includes a session token received from SSO authentication server 120 in association with a single-sign-on mechanism employed by applications 128 of client device 122 to authenticate a user identity in association with access of the respective content/services provided by the respective applications. In particular, prior to registration of one or more applications 128 for notifications related to the respective applications, a user of client device 122 can sign-in to the respective applications using a SSO mechanism between authentication component 124 and SSO authentication server 120.

For example, at 202 a user of client device 122 initially signs into applications 128 using a SSO mechanism. This can include provision of authentication information (e.g., username and password) for verification of the user identity in association with a user account the user has established with the respective applications 128. The authentication information is then sent by authentication component 124 to the SSO authentication server 120 for verification of the user identity. At 204, the SSO authentication server 120 performs an authentication procedure and generates an authentication token. The SSO authentication server 120 further provides this authentication token to the client device 122 for shared use between applications 128 to complete signing-in of the authorized user identity to the respective applications 128.

In an aspect, a similar procedure can be employed each time the user begins a new session. For example, at 206 a user can sign into respective applications 128 using the SSO mechanism and communicates (e.g., via authentication component 124) with SSO authentication server 120. At 208, the SSO authentication server generates a session authorization token based on the original authentication token at 208 and the sign-on information provided by the user. This session token is further provided by the SSO authentication server 120 to client device 122 for employment by respective applications 128 to complete signing-in of the authorized user identity to the respective applications 128. The SSO authentication server 120 can further store information associating the session token with the original authentication token. In another aspect, each time a user signs-in to the respective applications or begins a new session, authentication component 124 can generate the session token derived from the original authentication token stored at client device 122. As previously noted, the session authentication token contains enough information to identify the authentication token that it is derived from. Accordingly, the respective applications 128 can employ this same session token to sign the user into the respective applications.

At 210, the respective applications 128 can register for notifications. In particular, the applications can respectively include or employ registration component 126 to provide notification server 102 with information identifying the user or user account (e.g., user identifier or user account identifier) associated with the respective applications, the applications and/or versions of the applications (e.g., application identifiers), and the session token (e.g., which is derived from the original authorization token). At 214, this registration information is received by notification server 102. This registration information (or one or more part of this registration information) is also provided to ASP 114. For example, at 212, ASP 114 can receive and store this registration information. It should be appreciated that applications 128 do not need to register for notifications at the same time. However, the session tokens provided by each of the respective applications to notification server 102 at the time of registration are derived from the same original authentication token.

Upon receipt of the registration information, notification server 102 can check the validity of the session token at 216. In particular, the notification server 102 can communicate with the SSO authentication server 120 to verify the validity of the session token. When the notification server 102 receives a registration request, it verifies the authentication of the user by verifying the validity of the session token. For example, notification server 102 can employ authentication component 106 to communicate with SSO authentication server 120 to determine that the session token is derived from the original authorization token, thus verifying the authentication of the user identity and validity of the session token. According to this example, the SSO authentication server 120 has access to information that relates the session token to the original authentication token from which it was derived. At 218, the SSO authentication server 120 verifies the validity of the session token and provide verification to the notification server 102.

After the session token/user authentication is verified, the notification server 102 obtains a fingerprint (e.g., via fingerprint component 108) of the original authentication token from which the session token was derived. In an aspect, the SSO authentication server 120 computes the fingerprint of the original authentication token and provides it to the notification server 102 in response to verifying the validity of the session token at 218. In another aspect, notification server 102 can determine/generate the fingerprint of the authentication token from which the session token was derived. Then at 220, the applications are registered with the notification server by storing (e.g., in data store 112) information associating the applications (e.g., application identifiers) with the user identity/account (e.g., user identity/account identifiers) and the fingerprint.

In an alternative embodiment, a trusted frontend service provides to the notification server 102 both the session token verification service and the token lookup service. This trusted frontend service can then provide the notification service with a fingerprint of the authentication token along with the information identifying the user identity/account and application identifier(s). As a result, the registration service can simply receive all the information that it needs and does need to issue any calls to verify the session token or obtain a fingerprint for it. According to this aspect, the trusted frontend service can be embodied as a component provided on client device 122, provided by SSO authentication server 120, or a device/system separate from those depicted in FIG. 1.

Referring now to FIG. 3, the notification process 300 begins with ASP 114 at 302 wherein the ASP 114 sends a notification to notification server 102 for forwarding to the appropriate client applications. For exemplary purposes, the notification is directed to a specific user identity/account established with a first application and a second application, both of which are serviced by ASP 114. For example, where ASP 114 is a streaming media provider, the first application can include a view application and the second application can include a creator application.

Notification server 102 can include notification component 110 to receive and process notification requests from ASP 114. When processing a notification for the user identity/account, the notification component 110 identifies applications registered for the user identity/account and sorts them by authentication token fingerprint. For each authentication token fingerprint, it selects one application to notify at the exclusion of all the other applications associated with the token fingerprint. In particular, each token fingerprint groups all registered applications for the user identity/account provided on a single device. Notification component 110 can employ various mechanisms to determine which application to notify at the exclusion of all the other applications associated with the same token fingerprint. For example, notification component 110 can arbitrarily select one of the applications. In another example, notification component 110 can be directed by ASP 114 to select a particular one of the applications (e.g., ASP 114 can inform notification component which of the applications has priority). In yet another example, notification component 110 can receive information from the user identity/account indicating which application has priority.

Continuing with process 300, at 302 the notification server 102 receives the notification for the user identity/account directed to the first and second application (e.g., via notification component 110). At 304, the notification server 102 identifies first and second application registered with the user identity/account. At 306, the notification server 102 sorts the first and second application instances based on token fingerprint. At 308, the notification server 102 determines that both the first and second application are associated with a same token fingerprint (e.g., token fingerprint 1). At 310, the notification server selects one of the first or second applications for sending the notification to for fingerprint 1. At 312, the notification server sends the notification to all instances of the selected application. According to process 300, client device 122 includes an instance of the selected application. Accordingly, at 314, client device 122 receives the notification for the selected application.

Figure 4:
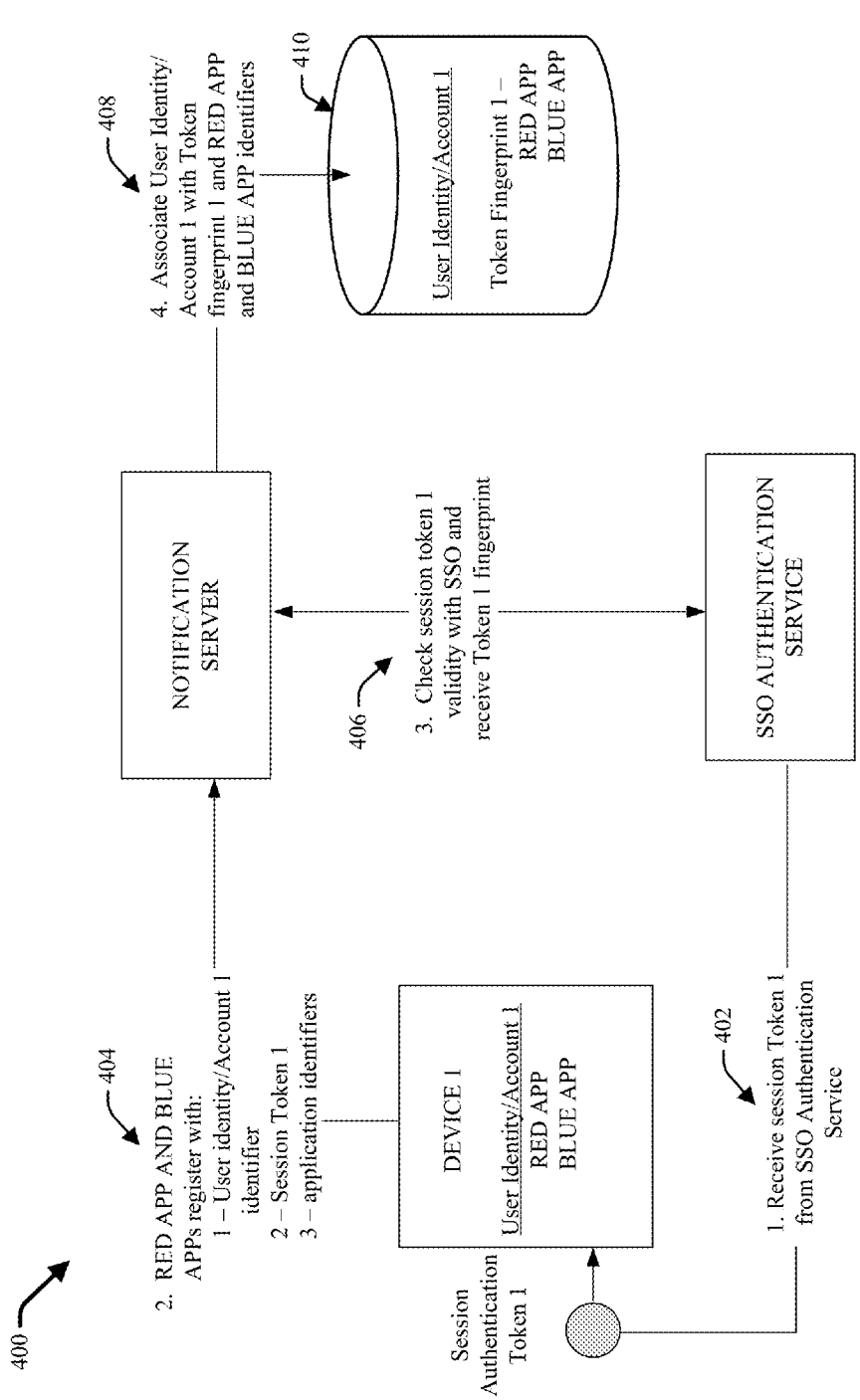
FIG. 4 provides a flow diagram of an example notification registration process in accordance with various aspects and embodiments described herein.
Figure 5:
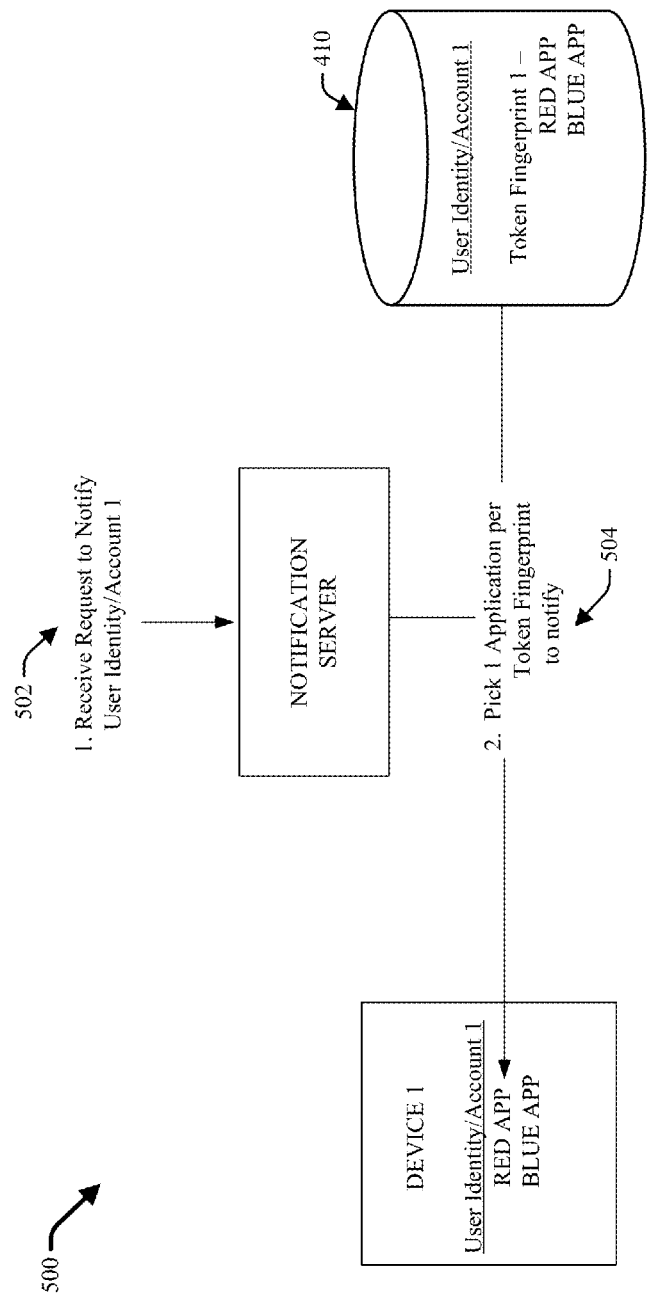
FIG. 5 provides a flow diagram of an example notification process in accordance with various aspects and embodiments described herein.
Figure 6:
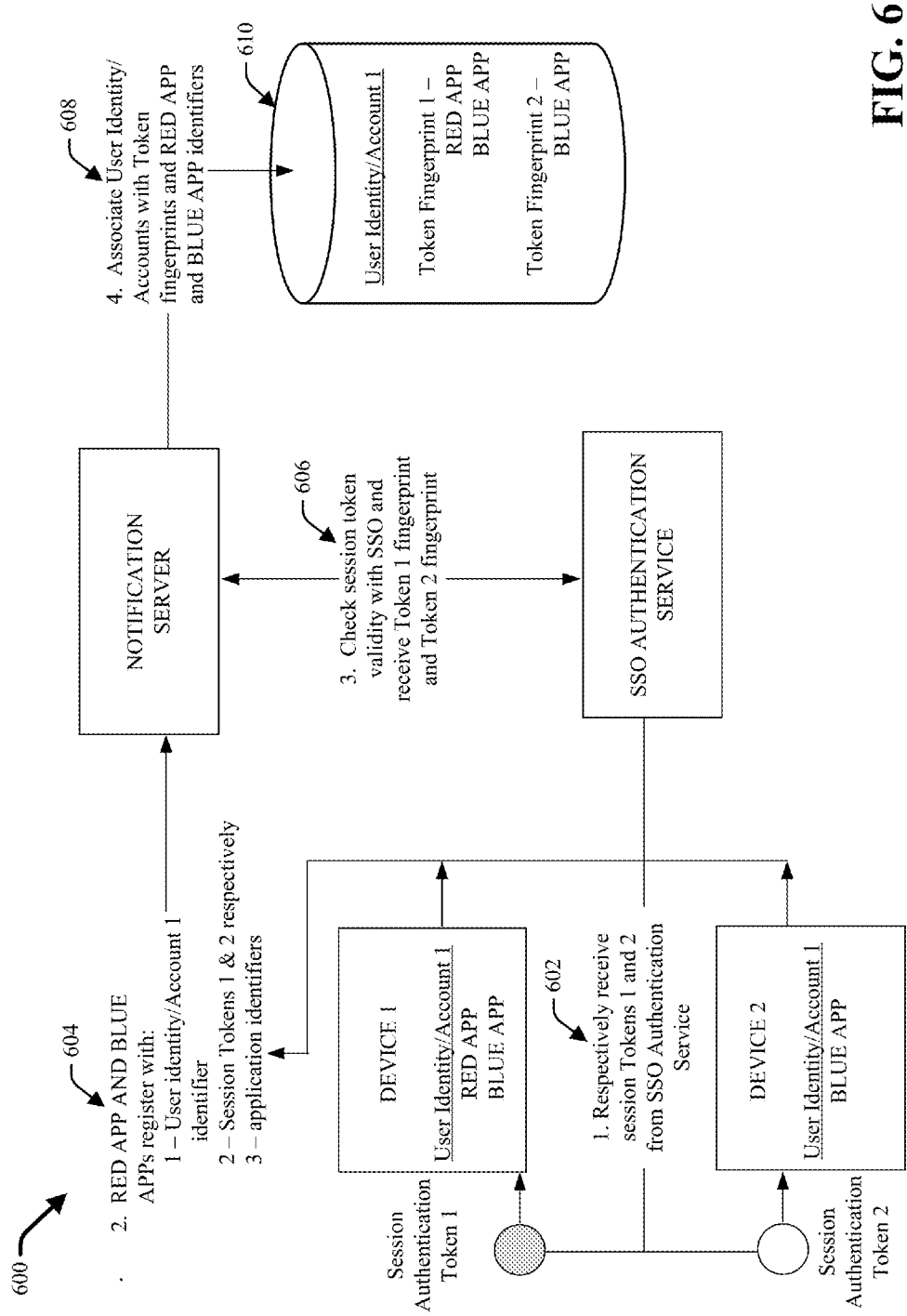
FIG. 6 provides a flow diagram of an example notification registration process in accordance with various aspects and embodiments described herein.
Figure 7:
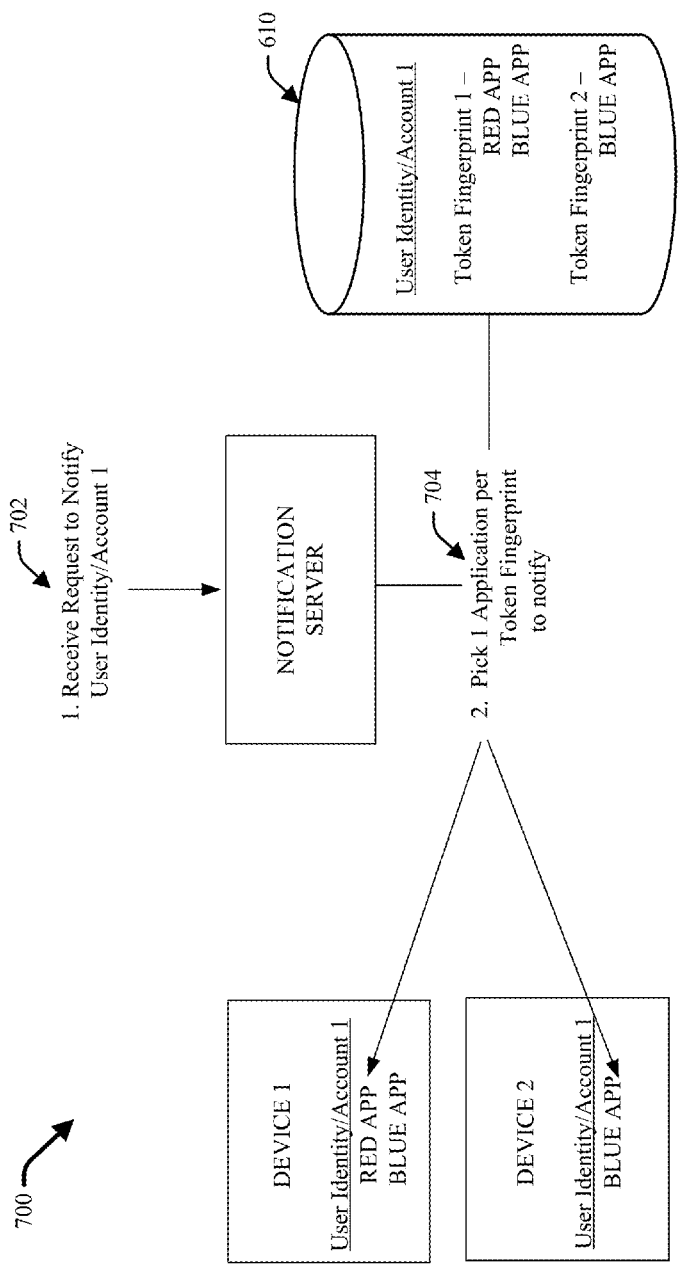
FIG. 7 provides a flow diagram of an example notification process in accordance with various aspects and embodiments described herein.
Figure 8:
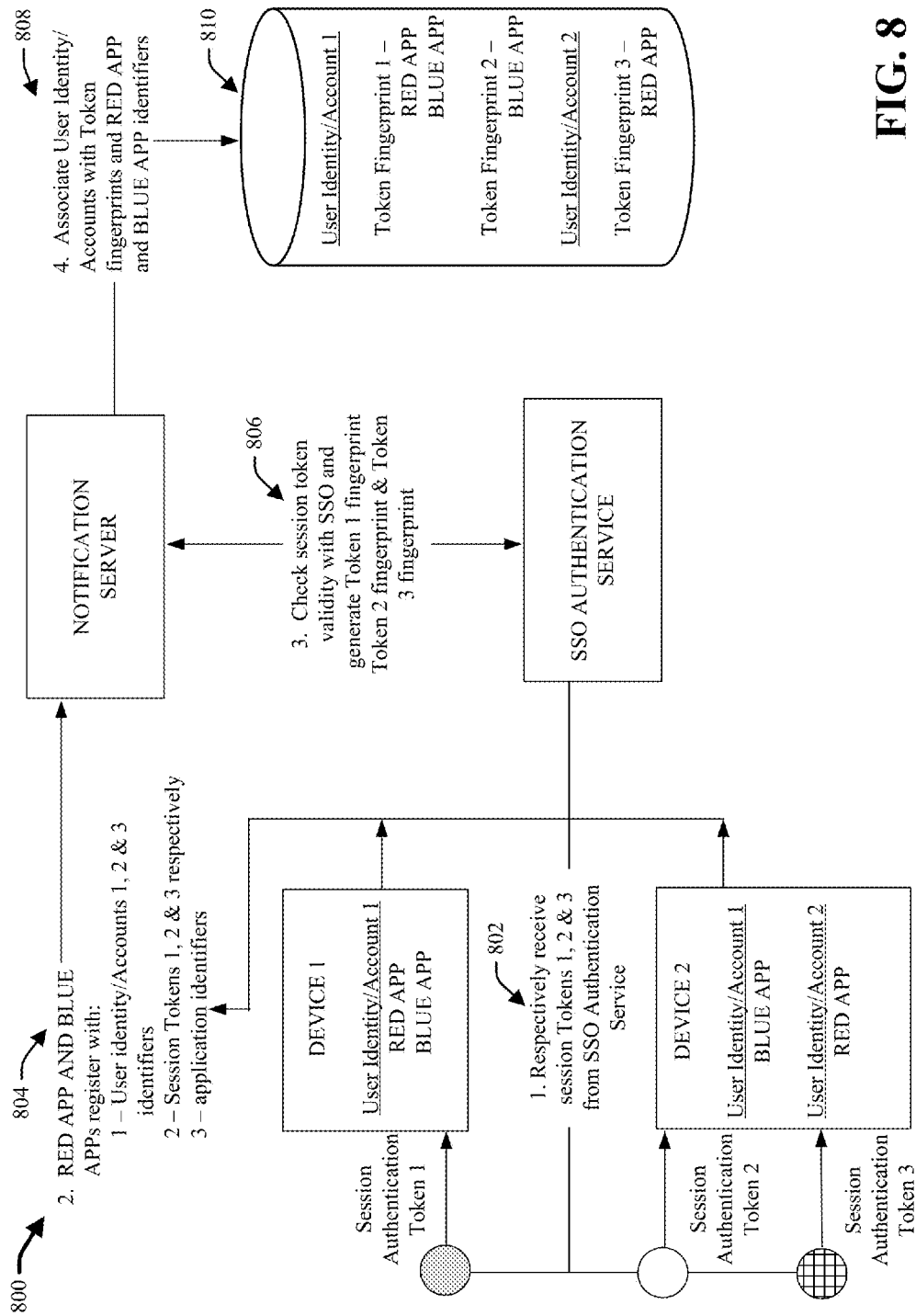
FIG. 8 provides a flow diagram of an example notification registration process in accordance with various aspects and embodiments described herein.
Figure 9:
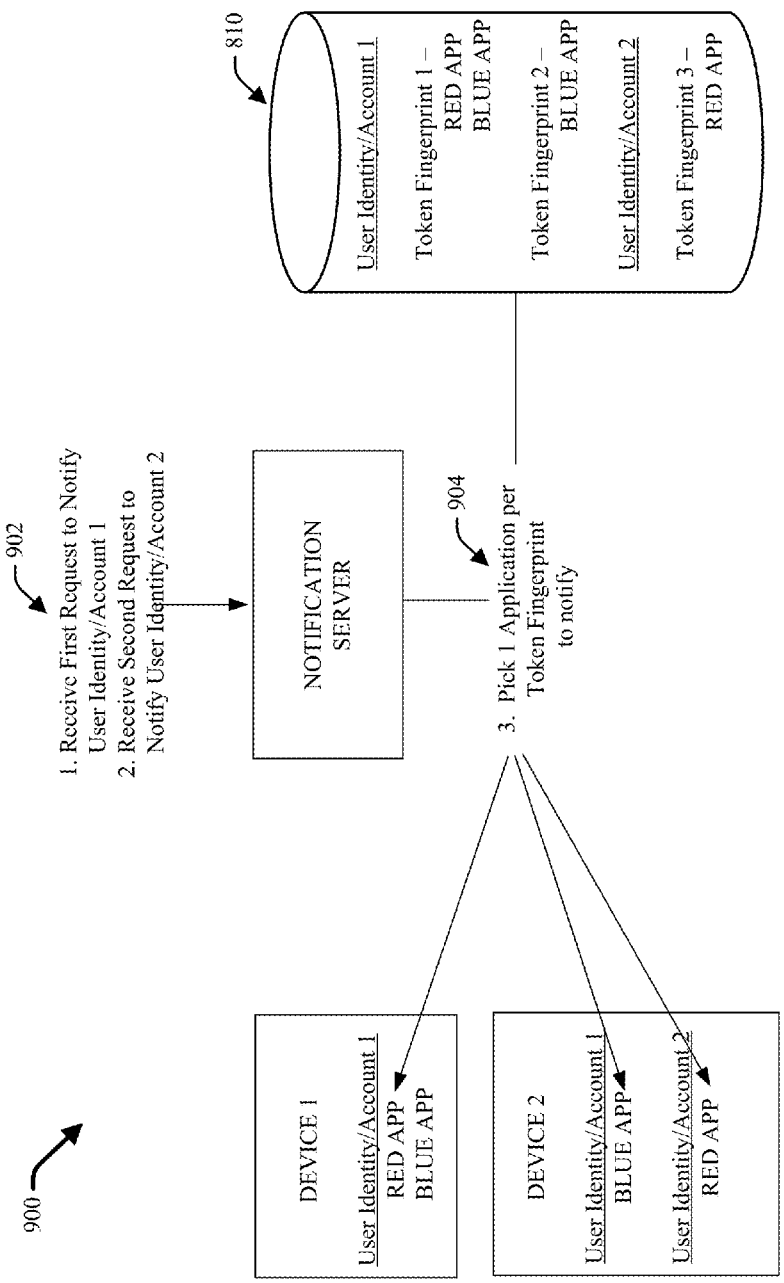
FIG. 9 provides a flow diagram of an example notification process in accordance with various aspects and embodiments described herein.

FIGS. 4, 6, and 8 present flow diagrams of example registration processes and FIGS. 5, 7 and 9 present corresponding notification processes for the respective registration processes in accordance with aspects and embodiments described herein. Repetitive description of like elements employed in respective embodiments of systems and methods described herein is omitted for sake of brevity.

With reference to FIG. 4, registration process 400 involves registration of applications provided on a single device, device 1 for a single user identity/account, account 1, established in association with the respective applications, with the notification server. These applications are referred to as the Red Application and the Blue Application At 402, the user signs into the Red application and the Blue application under account 1 via the SSO authentication service. In association with signing-in, the SSO authentication service provides device 1 with session authentication token 1. This session authentication token 1 is derived from an original authentication token generated by SSO authentication service in response to an initial SSO authentication mechanism employed at device 1 to authenticate the user identity/account 1 with the Red and Blue Applications Upon receipt of session token 1, the Red and Blue applications share session token 1 to authenticate and sign-on the user under account 1.

At 404, the Red and Blue applications register with the notification server for notifications in association with aspects of the respective applications. When registering, the respective applications provide the following information to the notification server: 1. an identifier for the user identity/account 1, 2. session token 1, and 3. an application identifier (e.g., that identify the particular type and/or version of the application). Upon receipt of the registration information, at 406 the notification server checks the validity of session token 1 with the SSO authentication service and request a fingerprint of the original authentication token from which session token 1 was derived. In response to a determination that session token 1 is valid, the SSO authentication service generates and returns the requested fingerprint to the notification server, referred to by example as token 1 fingerprint. Then at 408, the notification server associates the user identity/account 1 with token fingerprint 1 and the identifiers for the Red application and the Blue application in a data store 410 accessible to the notification server. For example, as seen in data store 410, the user identity/account 1 is registered to receive notifications for the Red application and the Blue application, and the Red application and the Blue application are associated under token fingerprint 1.

FIG. 5 provides an example notification process 500 following registration process 400. In particular, with notification process 500, at 502 the notification server is being requested (e.g., by the ASP for the Red and Blue applications), to notify the user identity/account 1. In response to the request, the notification server employs data store 410 to look up what applications are registered for the user identity/account 1 to receive the notification. Based on the registration information stored in data store 410, the notification server learns that both the Red application and the Blue application are registered for account 1 under token fingerprint 1. Because both the Red and Blue applications are associated under token fingerprint 1, this informs the notification server that both the Red application and the Blue application are located on the same device, device 1. In order to prevent duplicate notifications at device 1 for user identity/account 1, at 504 the notification server picks 1 application per token fingerprint to notify. For example, for token fingerprint 1, the notification server picks the Red application to notify. As a result, a single notification is provided to device 1 for account 1.

FIG. 6 demonstrates another example registration process 600 in accordance with aspects and embodiments described herein. Registration process 600 is similar to registration process 400 with the addition of a second user device, device 2. In particular, registration process 600 involves registration of applications provided on a two separate devices, device 1 and device 2 for a single user identity/account, account 1, established in association with the respective applications, with the notification server. These applications are referred to as the Red application and the Blue application Similar to process 400, device 1 includes both the Red application and the Blue application, and the user is signed into the Red application and the Blue application under user identity/Account 1. In addition, the user also employs device 2 and has the Blue application installed thereon. The user is also signed into the Blue application on device 2 under account 1.

At 602, the user signs into the Red application and the Blue application under account 1 via the SSO authentication service on both device 1 and device 2. In association with signing-in, the SSO authentication service provides device 1 with session authentication token 1 and device 2 with session authentication token 2. These session authentication tokens are respectively derived from original authentication tokens generated by SSO authentication service in response to an initial SSO authentication mechanism employed at device 1 and device 2, respectively, to authenticate the user identity/account 1 with the Red and Blue applications Upon receipt of session token 1 at device 1, the Red and Blue applications share session token 1 to authenticate and sign-on the user under account 1. Upon receipt of session token 2 at device 2, the Blue application authenticates and sign-on the user under account 1.

At 604, the Red and Blue applications register with the notification server for notifications in association with aspects of the respective applications. When registering, the respective applications provide the following information to the notification server: 1. an identifier for the user identity/account 1, 2. session token 1 or 2 (e.g., the instance of the Blue application on device 2 provides session token 2), and 3. an application identifier (e.g., that identify the particular type and/or version of the application). It should be appreciated that the applications of respective devices 1 and 2 do not need to register at the same time. Upon receipt of the registration information, at 606 the notification server checks the validity of session tokens 1 and 2 with the SSO authentication service and requests fingerprints of the original authentication tokens from which session token 1 and session token 2 were derived, respectively.

In response to a determination that session token 1 is valid, the SSO authentication service generates and returns the requested fingerprint to the notification server, referred to by example as token 1 fingerprint. Similarly, in response to a determination that session token 2 is valid, the SSO authentication service generates and returns the requested fingerprint to the notification server, referred to by example as token 2 fingerprint. At 608, the notification server associates the user identity/Account 1 with token fingerprint 1 and the identifiers for the Red application and the Blue application in a data store 610 accessible to the notification server. In addition, the notification server associates the user identity/account 1 with token fingerprint 2 and the identifier for the Blue application in a data store 610. For example, as seen in data store 610, user identity/account 1 is registered to receive notifications for the Red application and the Blue application Further, the Red application and the Blue application are associated under token fingerprint 1 and the Blue App is also associated under token fingerprint 2.

FIG. 7 provides an example notification process 700 following registration process 600. In particular, with notification process 700, at 702 the notification server is being requested (e.g., by the ASP for the Red and Blue applications), to notify the user identity/account 1. In response to the request, the notification server employs data store 610 to look up what applications are registered for the user identity/account 1 to receive the notification. Based on the registration information stored in data store 610, the notification server learns that both the Red application and the Blue application are registered for account 1 under token fingerprint 1. Because both the Red and Blue applications are associated under token fingerprint 1, this informs the notification server that both the Red application and the Blue application are located on the same device, device 1. In order to prevent duplicate notifications at device 1 for user identity/account 1, at 704 the notification server picks 1 application per token fingerprint to notify. For example, for token fingerprint 1, the notification server picks the Red application to notify. As a result, a single notification is provided to device 1 for account 1.

In addition, based on the registration information stored in data store 610, the notification server learns that the Blue application is registered for account 1 under token fingerprint 2. Because only the Blue application is associated under token fingerprint 2, this informs the notification server that only the Blue application is located on device 2. As a result, the notification server sends the notification to the Blue application at device 2 and a single notification is provided to device 2 for account 1.

FIG. 8 demonstrates another example registration process 800 in accordance with aspects and embodiments described herein. Registration process 800 is similar to registration process 600 with the addition of a second user account/identity, account 2. In particular, registration process 800 involves registration of applications provided on a two separate devices, device 1 and device 2 for two user identities/accounts, account 1 on devices 1 and 2 and account 2 on device 2, established in association with the respective applications, with the notification server. These applications are referred to as the Red application and the Blue application Similar to process 600, device 1 includes both the Red application and the Blue application, and the user is signed into the Red App and the Blue application under user identity/Account 1. The user is also signed into the Blue application on device 2 under account 1. In addition, the user (or another user) is signed into the Red application on device 2 under a second account, account 2.

At 802, the user signs into the Red application and the Blue application under account 1 at device 1, the Blue application at device 2 under account 1, and the Red application at device 2 under account 2, via the SSO authentication service. In association with signing-in, the SSO authentication service provides device 1/account 1 with session authentication token 1, device 2/account 1 with session authentication token 2, and device 2/account 2 with session authentication token 3. These session authentication tokens are respectively derived from original authentication tokens generated by SSO authentication service in response to an initial SSO authentication mechanism employed at device 1 and device 2, respectively, to authenticate the user identity/account 1 with the Red and Blue applications and the user identity/account 2 with the Red application Upon receipt of the session tokens 1, 2 and 3 at the respective device/account pairs, the user (or users) is authenticated and signed in.

At 804, the Red and Blue applications register with the notification server for notifications in association with aspects of the respective applications. When registering, the respective applications provide the following information to the notification server: 1. an identifier for the user identity/Account 1 or 2, 2. session token 1, 2 or 3 (e.g., the instances of the Red and Blue applications on device 1 provide session token 1, the instance of the Blue application on device 2 provides session token 2, and the instance of the Red App on device 2 provides session token 3), and 3. an application identifier (e.g., that identify the particular type and/or version of the application). It should be appreciated that the applications of respective devices 1 and 2 do not need to register at the same time. Upon receipt of the registration information, at 806 the notification server checks the validity of session tokens 1, 2 and 3 with the SSO authentication service and requests fingerprints of the original authentication tokens from which session tokens 1, 2, and 3 were derived, respectively.

In response to a determination that session token 1 is valid, the SSO authentication service generates and returns the requested fingerprint to the notification server, referred to by example as token 1 fingerprint. Similarly, in response to a determination that session token 2 is valid, the SSO authentication service generates and returns the requested fingerprint to the notification server, referred to by example as token 2 fingerprint. Further, in response to a determination that session token 3 is valid, the SSO authentication service generates and returns the requested fingerprint to the notification server, referred to by example as token 3 fingerprint At 808, the notification server associates the user identity/account 1 with token fingerprint 1 and the identifiers for the Red application and the Blue application in a data store 810 accessible to the notification server. In addition, the notification server associates the user identity/account 1 with token fingerprint 2 and the identifier for the Blue application in a data store 810. Further, the notification server associates the user identity/account 2 with token fingerprint 3 and the identifier for the Red application in a data store 810. For example, as seen in data store 810, user identity/account 1 is registered to receive notifications for the Red application and the Blue application Further, the Red application and the Blue application are associated under token fingerprint 1 and the Blue application is also associated under token fingerprint 2. In addition, user identity/account 2 is registered to receive notifications for the Red application in association with token fingerprint 3.

FIG. 9 provides an example notification process 900 following registration process 600. In particular, with notification process 900, at 902 the notification server is being requested (e.g., by the ASP for the Red and Blue applications), to notify user identity/account 1 and user identity/account 2. It should be appreciated that these requests can be received and processed at different times. In response to the requests, the notification server employs data store 810 to look up what applications are registered for the user identity/account 1 and user identity/account 2 to receive the notification. Based on the registration information stored in data store 810, the notification server learns that both the Red application and the Blue application are registered for account 1 under token fingerprint 1. Because both the Red and Blue applications are associated under token fingerprint 1, this informs the notification server that both the Red application and the Blue application are located on the same device, device 1. In order to prevent duplicate notifications at device 1 for user identity/account 1, at 904 the notification server picks 1 application per token fingerprint to notify. For example, for token fingerprint 1, the notification server picks the Red application to notify. As a result, a single notification is provided to device 1 for account 1.

In addition, based on the registration information stored in data store 810, the notification server learns that the Blue application is registered for account 1 under token fingerprint 2. Because only the Blue application is associated under token fingerprint 2, this informs the notification server that only the Blue application is located on device 2. As a result, the notification server sends the notification to the Blue application at device 2 and a single notification is provided to device 2 for account 1.

Further, based on the registration information stored in data store 810, the notification server learns that the Red application is registered for account 2 under token fingerprint 3. Because only the Red application is associated under token fingerprint 3, this informs the notification server that only the Red application is located on device 2 under account 2. As a result, the notification server sends the notification to the Red application at device 2 for account 2. According to process 900, although device 2 receives two notifications, these notifications are targeted to different user accounts.

Figure 10:
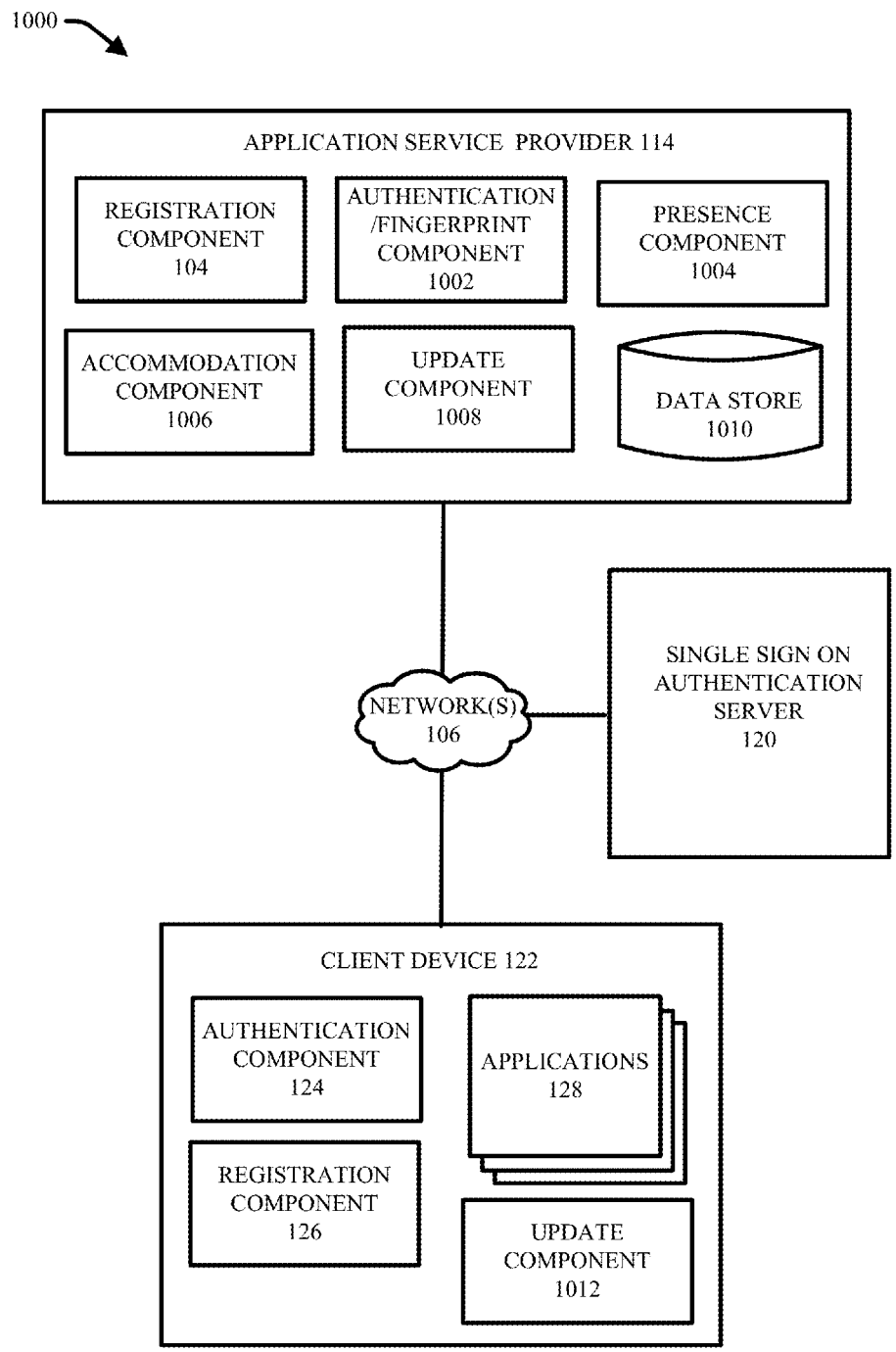
FIG. 10 illustrates another example system for determining, by a remote system, applications provided on a device based on association with a common identifier in accordance with various aspects and embodiments described herein.

Turning now to FIG. 10, presented is another example system 1000 for determining, by a remote system, applications provided on a device based on association with a common identifier in accordance with various aspects and embodiments described. System 1000 includes same or similar features as system 100. Repetitive description of like elements employed in respective embodiments of systems and methods described herein is omitted for sake of brevity.

With system 100, a notification service can determine which applications are provided on a single device and associated with a single user identity/account based on association with the same SSO authentication token or authentication token fingerprint. In turn, the notification server can prevent sending of duplicate notifications to the device where two or more applications on the device signed in under the same user identity/account are capable of receiving the same notification. In particular, the notification server can select only one of the two or more applications to send the given notification to.

Usage of a shared SSO authentication token between applications to determine what applications are installed on a device and associated with a same user identity can be extended to different applications in addition to prevention of duplicate notifications. For example, various other online services aside from a notification server can customize offerings to a user identity/client device based on what applications the user has on his or her device and what applications the user is actually currently signed into for a given session. For instance, based on what applications a user has provided on his device, an application merchant (e.g., play store) may suggest other applications that the user may be interested in downloading.

System 1000 provides some additional examples of features that can be offered by the ASP 114 servicing one or more application 128 provided on client device 122 based on knowledge of other applications 128 provided on the client device as deduced by a SSO authentication token or authentication token fingerprint that is shared between the applications. In an accordance with an embodiment, ASP 114 can include authentication/fingerprint component 1002, presence component 1004, accommodation component 1006, update component 1008 and data store 1010.

Authentication/fingerprint component 1002 can perform same or operations to that of authentication component 106 and fingerprint component 108. In particular, client device 122 can register with ASP 114 to receive customized offerings based on applications co-existing on client device 122. Similar to the other registration processes disclosed herein, registration can involve provision of registration information to ASP 114 (e.g., to registration component 104) via registration component 126. The registration information can include an account identifier for a user account a user of client device 122 has established with two or more applications 128, application identifiers for the two or more applications (e.g., indicating the name of the application, type of the application, version of application, etc.) and an SSO session authentication token. In response to receipt of the registration information, authentication/fingerprint component 1002 can verify the validity of the session authentication token by communicating with SSO authentication server 120. In response to verification of the session token (e.g., determining that it is derived from a particular original authentication token for the user identity/account and client device 122), the SSO authentication server 120 can provide authentication/fingerprint component 1002 with a fingerprint of the original authentication token. Registration component 104 can further associate the registration information with one another in data store 1010. In particular, registration component 104 can sort applications to which the user has established an account based on association of the applications with a same token fingerprint. The ASP 114 can thus determine that based on association with the same token fingerprint, that those applications are provided on the same device and open under the same user identity/account.

In an aspect, presence component 1004 is configured to determine what applications a user is presently accessing (e.g., signed-into) based on association with the same session token. According to this aspect, aside from or in addition to associating applications under a same token fingerprint, presence component can simply deduce what applications a user is currently singed into on an device based on association with the same session token provided in the registration information.

Based on knowledge of what applications a user has installed on the same device and/or what application a user is currently signed into ASP 114 can provide customized and/or optimized features of the applications on the client device that are serviced by ASP 114. In an aspect, ASP 114 can include accommodation component 1006 that can modify application offerings based on overlapping or complimentary features of two or more applications provided on client device. For example, where ASP 114 is a streaming media provider and client device 122 has a viewer application and creator application installed, ASP 114 can choose to hide a feature in the creator application (e.g., a "comments" feature) where it also is provided in the viewer application (and vice versa) or the ASP 114 can choose to replace an overlapping feature in the viewer application with a link to the feature in the viewer application. Adaptations to features determined by accommodation component can be implemented via sending of updates to the corresponding application. ASP 114 can include update component 1008 to send such updates and client device 122 can include update component 1012 to receive and implement such updates.

Figure 11:
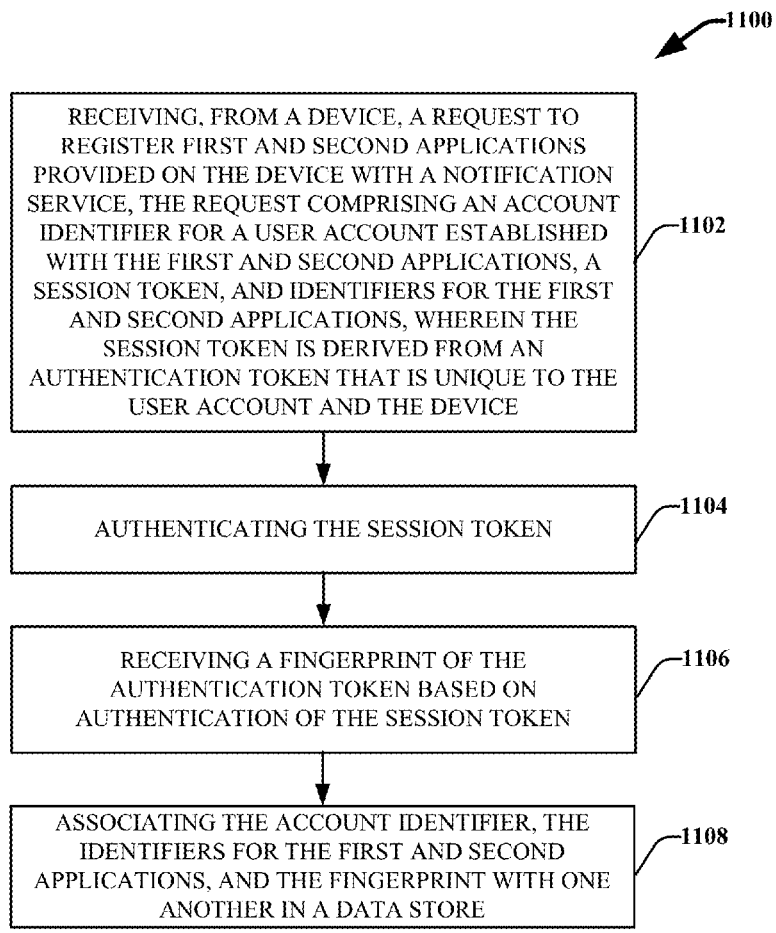
FIG. 11 is a flow diagram of an example method for determining, by a remote system, applications provided on a device based on association with a common identifier in accordance with various aspects and embodiments described herein.
Figure 12:
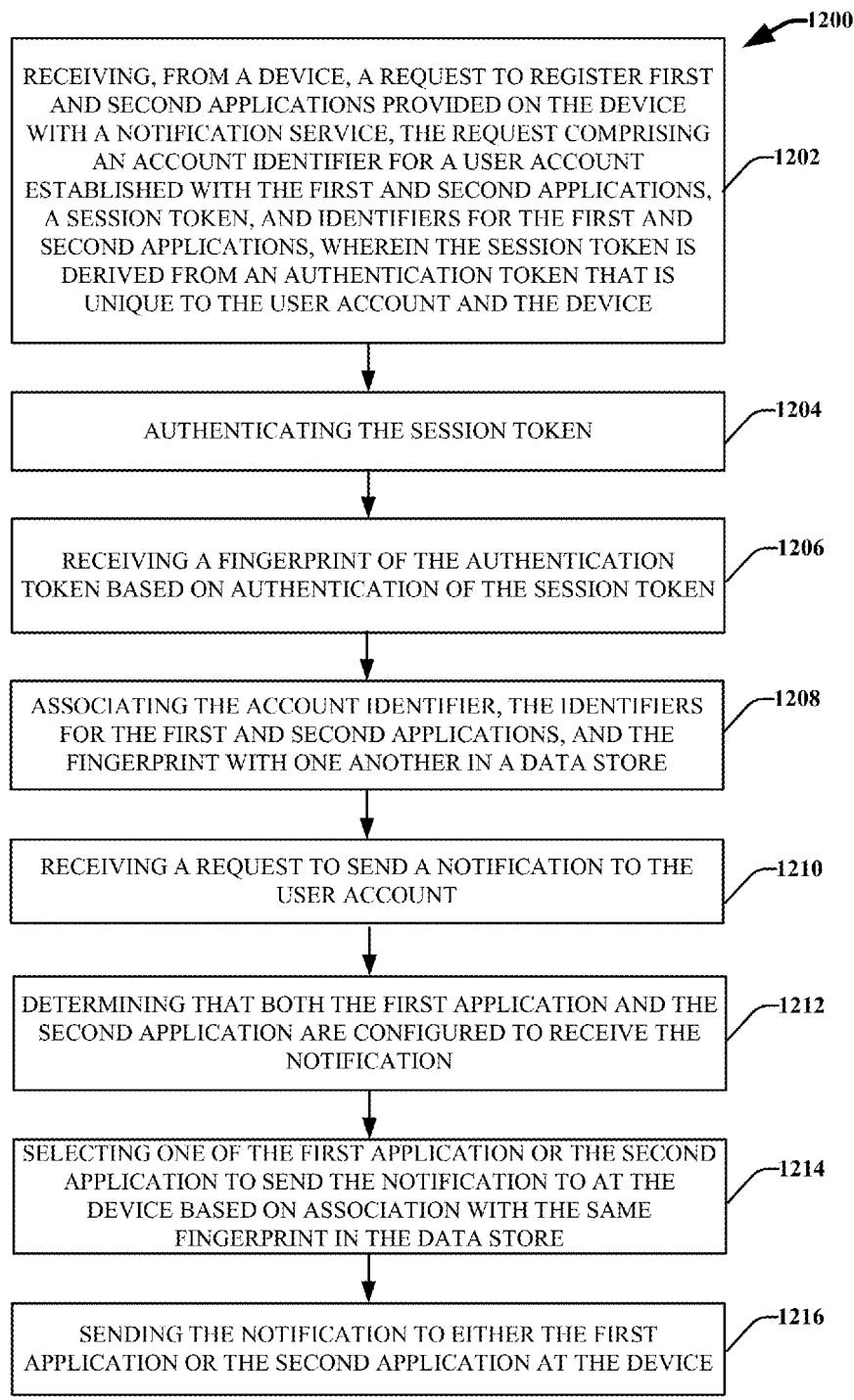
FIG. 12 is a flow diagram of another example method for determining, by a remote system, applications provided on a device based on association with a common identifier in accordance with various aspects and embodiments described herein.
Figure 13:
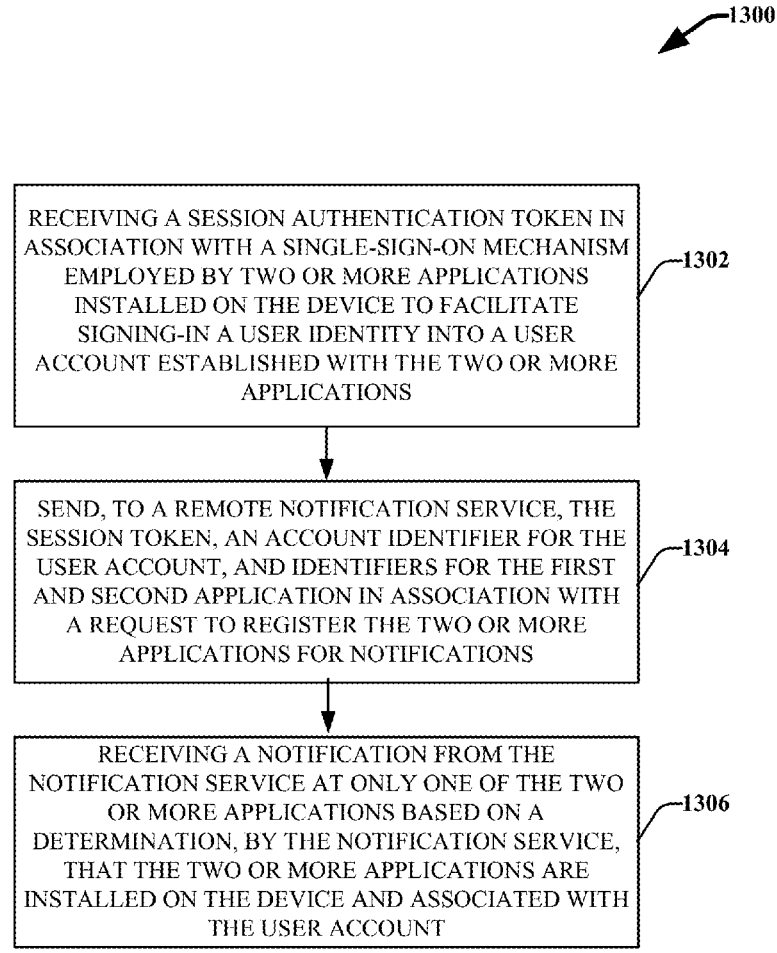
FIG. 13 is a flow diagram of another example method for determining, by a remote system, applications provided on a device based on association with a common identifier in accordance with various aspects and embodiments described herein.

In view of the example systems and/or devices described herein, example methods that can be implemented in accordance with the disclosed subject matter can be further appreciated with reference to flowcharts in FIGS. 11-13. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 11 illustrates a flow chart of an example method 1100 for determining applications provided on a device based on association with a common identifier in accordance with various aspects and embodiments described herein. At 1102, a request is received from a device (e.g., client device 122) to register first and second applications provided on the device with a notification service (e.g., notification server 102). The request includes an account identifier for a user account established with the first and second applications, a session token, and identifiers for the first and second applications. The session token is derived from an authentication token that is unique to the user account and the device. At 1104, the session token is authenticated. For example, the notification server 102 can provide the session token to the SSO authentication server 120 and request verification of session token. The SSO authentication server 120 can then verify the session token by determining whether it was actually derived from authentication tied to the user account. In association with verification of the session token, the SSO authentication server 120 can generate a fingerprint of the authentication token and provide this fingerprint to the notification server 102. At 1106, a fingerprint of the authentication token is received (e.g., via fingerprint component 108) based on authentication of the session token. Then at 1108, the account identifier, the identifiers for the first and second applications, and the fingerprint are associated with one another in a data store (e.g., via registration component 104).

FIG. 12 illustrates a flow chart of another example method 1200 for determining applications provided on a device based on association with a common identifier in accordance with various aspects and embodiments described herein. At 1202, a request is received from a device (e.g., client device 122) to register first and second applications provided on the device with a notification service (e.g., notification server 102). The request includes an account identifier for a user account established with the first and second applications, a session token, and identifiers for the first and second applications. The session token is derived from an authentication token that is unique to the user account and the device. At 1204, the session token is authenticated. For example, the notification server 102 can provide the session token to the SSO authentication server 120 and request verification of session token. The SSO authentication server 120 can then verify the session token by determining whether it was actually derived from authentication tied to the user account. In association with verification of the session token, the SSO authentication server 120 can generate a fingerprint of the authentication token and provide this fingerprint to the notification server 102. At 1206, a fingerprint of the authentication token is received (e.g., via fingerprint component 108) based on authentication of the session token. Then at 1208, the account identifier, the identifiers for the first and second applications, and the fingerprint are associated with one another in a data store (e.g., via registration component 104).

At 1210, request to send a notification to the user account is received (e.g., via notification component 110). At 1212, a determination is made that both the first application and the second application are configured to receive the notification (e.g., via notification component 110). At 1214, one of the first application or the second applications is selected to send the notification to at the device based on association with the same fingerprint in the data store. Then at 1216, the notification is sent to either the first application or the second application at the device.

FIG. 13 illustrates a flow chart of another example method 1300 for determining applications provided on a device based on association with a common identifier in accordance with various aspects and embodiments described herein. At 1302, a device (e.g., client device 122) receive a session authentication token in association with a single-sign-on mechanism employed by two or more applications installed on the device to facilitate signing-in a user identity into a user account established with the two or more applications (e.g., via authentication component 124). At 1304, in association with registering for a notification service, the device sends, to a remote notification service, the session token, an account identifier for the user account, and identifiers for the first and second application in association with a request to register the two or more applications for notifications. At 1306, a notification is received at the device from the notification service at only one of the two or more applications based on a determination, by the notification service, that the two or more applications are installed on the device and associated with the user account (e.g., via notification component 130).

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 14:
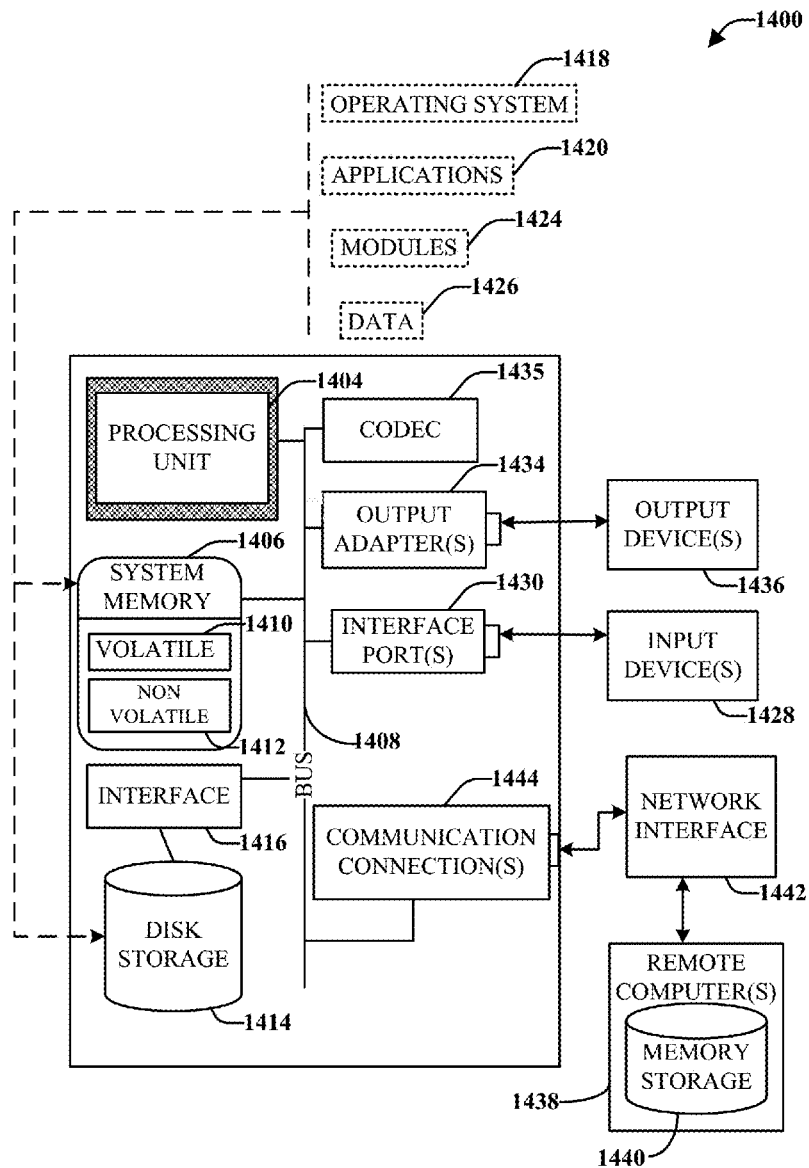
FIG. 14 is a schematic block diagram illustrating a suitable operating environment in accordance with various aspects and embodiments.

With reference to FIG. 14, a suitable environment 1400 for implementing various aspects of the claimed subject matter includes a computer 1402. The computer 1402 includes a processing unit 1404, a system memory 1406, a codec 1405, and a system bus 1408. The system bus 1408 couples system components including, but not limited to, the system memory 1406 to the processing unit 1404. The processing unit 1404 can be any of various available processors. Dual microprocessors and other multiprocessor architectures also can be employed as the processing unit 1404.

The system bus 1408 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 13144), and Small Computer Systems Interface (SCSI).

The system memory 1406 includes volatile memory 1410 and non-volatile memory 1412. The basic input/output system (BIOS), containing the basic routines to transfer information between elements within the computer 1402, such as during start-up, is stored in non-volatile memory 1412. In addition, according to present innovations, codec 1405 may include at least one of an encoder or decoder, wherein the at least one of an encoder or decoder may consist of hardware, a combination of hardware and software, or software. Although, codec 1405 is depicted as a separate component, codec 1405 may be contained within non-volatile memory 1412. By way of illustration, and not limitation, non-volatile memory 1412 can include read only memory (ROM), programmable ROM (PROM), electrically programmable ROM (EPROM), electrically erasable programmable ROM (EEPROM), or flash memory. Volatile memory 1410 includes random access memory (RAM), which acts as external cache memory. According to present aspects, the volatile memory may store the write operation retry logic (not shown in FIG. 14) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1402 may also include removable/non-removable, volatile/non-volatile computer storage medium. FIG. 14 illustrates, for example, disk storage 1414. Disk storage 1414 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1414 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1414 to the system bus 1408, a removable or non-removable interface is typically used, such as interface 1416.

It is to be appreciated that FIG. 14 describes software that acts as an intermediary between users and the basic computer resources described in the suitable operating environment 1400. Such software includes an operating system 1418. Operating system 1418, which can be stored on disk storage 1414, acts to control and allocate resources of the computer system 1402. Applications 1420 take advantage of the management of resources by operating system 1418 through program modules 1424, and program data 1426, such as the boot/shutdown transaction table and the like, stored either in system memory 1406 or on disk storage 1414. It is to be appreciated that the claimed subject matter can be implemented with various operating systems or combinations of operating systems.

A user enters commands or information into the computer 1402 through input device(s) 1428. Input devices 1428 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1404 through the system bus 1408 via interface port(s) 1430. Interface port(s) 1430 include, for example, a serial port, a parallel port, a game port, and a universal serial bus (USB). Output device(s) 1436 use some of the same type of ports as input device(s). Thus, for example, a USB port may be used to provide input to computer 1402, and to output information from computer 1402 to an output device 1436. Output adapter 1434 is provided to illustrate that there are some output devices 1436 like monitors, speakers, and printers, among other output devices 1436, which require special adapters. The output adapters 1434 include, by way of illustration and not limitation, video and sound cards that provide a means of connection between the output device 1436 and the system bus 1408. It should be noted that other devices and/or systems of devices provide both input and output capabilities such as remote computer(s) 1438.

Computer 1402 can operate in a networked environment using logical connections to one or more remote computers, such as remote computer(s) 1438. The remote computer(s) 1438 can be a personal computer, a server, a router, a network PC, a workstation, a microprocessor based appliance, a peer device, a smart phone, a tablet, or other network node, and typically includes many of the elements described relative to computer 1402. For purposes of brevity, only a memory storage device 1440 is illustrated with remote computer(s) 1438. Remote computer(s) 1438 is logically connected to computer 1402 through a network interface 1442 and then connected via communication connection(s) 1444. Network interface 1442 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1444 refers to the hardware/software employed to connect the network interface 1442 to the bus 1408. While communication connection 1444 is shown for illustrative clarity inside computer 1402, it can also be external to computer 1402. The hardware/software necessary for connection to the network interface 1442 includes, for exemplary purposes only, internal and external technologies such as, modems including regular telephone grade modems, cable modems and DSL modems, ISDN adapters, and wired and wireless Ethernet cards, hubs, and routers.

Figure 15:
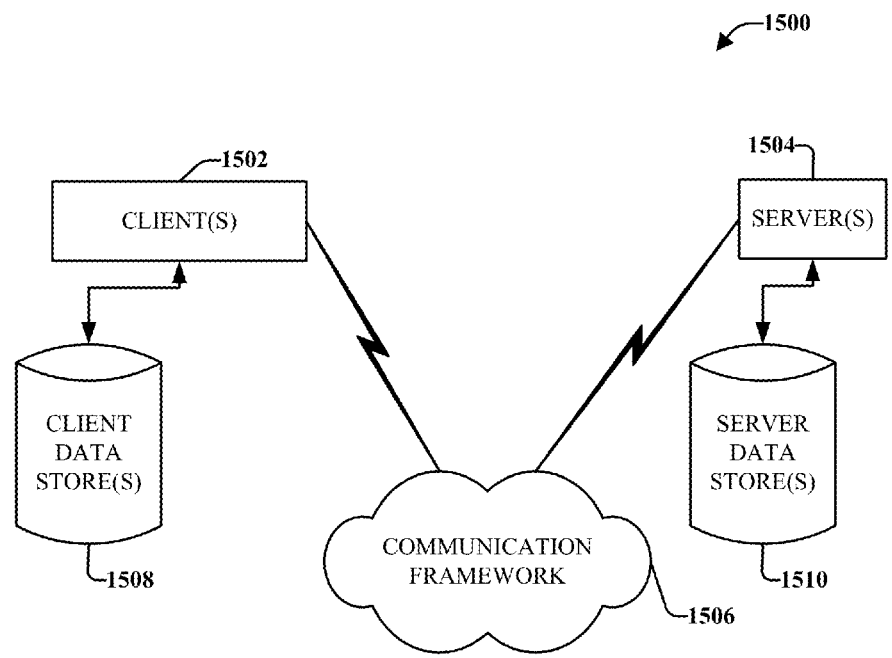
FIG. 15 is a schematic block diagram of a sample-computing environment in accordance with various aspects and embodiments.

Referring now to FIG. 15, there is illustrated a schematic block diagram of a computing environment 1500 in accordance with this disclosure. The system 1500 includes one or more client(s) 1502 (e.g., laptops, smart phones, PDAs, media players, computers, portable electronic devices, tablets, and the like). The client(s) 1502 can be hardware and/or software (e.g., threads, processes, computing devices). The system 1500 also includes one or more server(s) 1504. The server(s) 1504 can also be hardware or hardware in combination with software (e.g., threads, processes, computing devices). The servers 1504 can house threads to perform transformations by employing aspects of this disclosure, for example. One possible communication between a client 1502 and a server 1504 can be in the form of a data packet transmitted between two or more computer processes wherein the data packet may include video data. The data packet can include a metadata, e.g., associated contextual information, for example. The system 1500 includes a communication framework 1506 (e.g., a global communication network such as the Internet, or mobile network(s)) that can be employed to facilitate communications between the client(s) 1502 and the server(s) 1504.

Communications can be facilitated via a wired (including optical fiber) and/or wireless technology. The client(s) 1502 include or are operatively connected to one or more client data store(s) 1508 that can be employed to store information local to the client(s) 1502 (e.g., associated contextual information). Similarly, the server(s) 1504 are operatively include or are operatively connected to one or more server data store(s) 1510 that can be employed to store information local to the servers 1504.

In one embodiment, a client 1502 can transfer an encoded file, in accordance with the disclosed subject matter, to server 1504. Server 1504 can store the file, decode the file, or transmit the file to another client 1502. It is to be appreciated, that a client 1502 can also transfer uncompressed file to a server 1504 and server 1504 can compress the file in accordance with the disclosed subject matter. Likewise, server 1504 can encode video information and transmit the information via communication framework 1506 to one or more clients 1502.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A system, comprising:
   a memory; and
   a processor, coupled to the memory, to:
   receive, from a first device, one or more requests to register a first instance of a first application and a first instance of a second application, as provided on the first device, with a notification service, the one or more requests comprising an account identifier associated with a user identity, a first session token, an identifier for the first application and an identifier for the second application, wherein the first session token is derived from a first authentication token that is unique to the user identity and the first device;
   authenticate the user identity using the first session token;
   associate a first fingerprint of the first authentication token, the account identifier, the identifier for the first application and the identifier for the second application in a data store;
   receive, from a second device, a request to register a second instance of the first application, as provided on the second device, with the notification service, the request comprising the account identifier associated with the user identity, a second session token, and the identifier for the first application, wherein the second session token is derived from a second authentication token that is unique to the user identity and the second device;
   authenticate the user identity using the second session token; and associate a second fingerprint of the second authentication token, the account identifier, and the identifier for the first application in the data store, wherein the first fingerprint facilitates a selection between the first instance of the first application and the first instance of the second application to receive a notification at the first device, and the second fingerprint facilitates a selection of the second instance of the first application to receive the notification at the second device.

2. The system of claim 1, wherein the first and second authentication tokens and the first and second session tokens are generated via a single-sign-on user authentication mechanism used to sign into the first application at the first and second devices.

3. The system of claim 2, wherein associating the first fingerprint and the second fingerprint comprises receiving the first fingerprint and the second fingerprint respectively from a single-sign-on authentication server affiliated with the authentication mechanism.

4. The system of claim 1, wherein to receive the one or more requests to register the first instance of the second application, the processor is further to:
receive, from the first device, the account identifier associated with the user identity, a third session token, and the identifier for the second application, wherein the third session token is derived from the first authentication token;
authenticate the user identity using the third session token;
receive the first fingerprint of the first authentication token based on authentication of the user identity using the third session token; and
associate the account identifier, the identifier for the second application, and the first fingerprint in the data store.

5. The system of claim 1, wherein the processor is further to:
receive a request to send the notification to the user identity, and select, in response to the request, one of the first instance of the first application or the first instance of the second application to receive the notification at the first device based on association with the same fingerprint in the data store.

6. The system of claim 5, wherein the notification is sent to either the first instance of the first application or the first instance of the second application at the first device.

7. The system of claim 1, wherein the processor is further to select either the first application or the second application based on a predetermined priority order associated with the respective applications.

8. A method comprising:
receiving, from a first device, one or more requests to register a first instance of a first application and a first instance of a second application, as provided on the first device, with a notification service, the one or more requests comprising an account identifier associated with a user identity, a first session token, an identifier for the first application and an identifier for the second application, wherein the first session token is derived from a first authentication token that is unique to the user identity and the first device;
authenticating, by a processing device, the user identity using the first session token;
associating, by the processing device, a first fingerprint of the first authentication token, the account identifier, the identifier for the first application and the identifier for the second application in a data store;
receiving, from a second device, a request to register a second instance of the first application, as provided on the second device, with the notification service, the request comprising the account identifier associated with the user identity, a second session token, and the identifier for the first application, wherein the second session token is derived from a second authentication token that is unique to the user identity and the second device;
authenticating, by the processing device, the user identity using the second session token; and
associating, by the processing device, a second fingerprint of the second authentication token, the account identifier, and the identifier for the first application in the data store, wherein the first fingerprint facilitates a selection between the first instance of the first application and the first instance of the second application to receive a notification at the first device, and the second fingerprint facilitates a selection of the second instance of the first application to receive the notification at the second device.

9. The method of claim 8, wherein the first and second authentication tokens and the first and second session tokens are generated via a single-sign-on user authentication mechanism used to sign into the first application at the first and second devices.

10. The method of claim 9, wherein associating the first fingerprint and the second fingerprint comprises receiving the first fingerprint and the second fingerprint respectively from a single-sign-on authentication server affiliated with the authentication mechanism.

11. The method of claim 8, wherein receiving the one or more requests to register the second application comprises:
receiving, from the first device, the account identifier associated with the user identity, a third session token, and the identifier for the second application, wherein the third session token is derived from the first authentication token;
authenticating the user identity using the third session token;
receiving the first fingerprint of the first authentication token based on authentication of the user identity using the third session token; and
associating the account identifier, the identifier for the second application, and the first fingerprint in the data store.

12. The method of claim 8, further comprising:
receiving a request to send the notification to the user identity; and
selecting, in response to the request, one of the first instance of the first application or the first instance of the second application to receive the notification at the first device based on association with the same fingerprint in the data store.

13. The method of claim 12, further comprising:
sending the notification to either the first instance of the first application or the first instance of the second application at the first device.

14. The method of claim 8, further comprising:
selecting either the first application or the second application based on a predetermined priority order associated with the respective applications.

15. A non-transitory computer-readable storage medium having instructions stored therein, which when executed, cause a processor to:

receive, from a first device, one or more requests to register a first instance of a first application and a first instance of a second application, as provided on the first device, with a notification service, the one or more requests comprising an account identifier associated with a user identity, a first session token, an identifier for the first application and an identifier for the second application, wherein the first session token is derived from a first authentication token that is unique to the user identity and the first device;

authenticate the user identity using the first session token;

associate a first fingerprint of the first authentication token, the account identifier, the identifier for the first application and the identifier for the second application in a data store;

receive, from a second device, a request to register a second instance of the first application, as provided on the second device, with the notification service, the request comprising the account identifier associated with the user identity, a second session token, and the identifier for the first application, wherein the second session token is derived from a second authentication token that is unique to the user identity and the second device;

authenticate the user identity using the second session token; and associate a second fingerprint of the second authentication token, the account identifier, and the identifier for the first application in the data store, wherein the first fingerprint facilitates a selection between the first instance of the first application and the first instance of the second application to receive a notification at the first device, and the second fingerprint facilitates a selection of the second instance of the first application to receive the notification at the second device.

16. The non-transitory computer-readable storage medium of claim 15, wherein the first and second authentication tokens and the first and second session tokens are generated via a single-sign-on user authentication mechanism used to sign into the first application at the first and second devices.

17. The non-transitory computer-readable storage medium of claim 16, wherein to associate the first fingerprint and the second fingerprint, the processor is to receive the first fingerprint and the second fingerprint respectively from a single-sign-on authentication server affiliated with the authentication mechanism.

18. The non-transitory computer-readable storage medium of claim 15, wherein receiving the request to register the second application comprises receiving, from the first device the account identifier associated with the user identity, a third session token, and the identifier for the second application, wherein the third session token is derived from the first authentication token;

authenticate the user identity using the third session token;

receive the first fingerprint of the first authentication token based on authentication of the user identity using the third session token; and associate the account identifier, the identifier for the second application, and the first fingerprint in the data store.

19. The non-transitory computer-readable storage medium of claim 15, wherein the processor is further to:

receive a request to send the notification to the user identity, and select, in response to the request, one of the first instance of the first application or the first instance of the second application to receive the notification at the first device based on association with the same fingerprint in the data store.

20. The non-transitory computer-readable storage medium of claim 19, wherein the notification is sent to either the first instance of the first application or the first instance of the second application at the first device.

21. The non-transitory computer-readable storage medium of claim 15, wherein the processor is further to select either the first application or the second application based on a predetermined priority order associated with the respective applications.

* * * * *